United States Patent
Krishna et al.

(10) Patent No.: US 9,954,580 B2
(45) Date of Patent: Apr. 24, 2018

(54) DIELECTRIC MATERIALS FOR POWER TRANSFER SYSTEMS

(75) Inventors: Kalaga Murali Krishna, Bangalore (IN); Lohit Matani, Uttar Pradesh (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1046 days.

(21) Appl. No.: 13/560,365

(22) Filed: Jul. 27, 2012

(65) Prior Publication Data

US 2013/0193770 A1    Aug. 1, 2013

(30) Foreign Application Priority Data

Jul. 28, 2011    (IN) .......................... 2583/CHE/2011

(51) Int. Cl.
| | |
|---|---|
| *H04B 5/00* | (2006.01) |
| *C08K 3/22* | (2006.01) |
| *H01P 11/00* | (2006.01) |

(52) U.S. Cl.
CPC ............. *H04B 5/0037* (2013.01); *C08K 3/22* (2013.01); *H01P 11/008* (2013.01)

(58) Field of Classification Search
CPC ........ H01P 11/008; H04B 5/0037; C08K 3/22
USPC ........ 307/104; 427/126.1; 523/458; 524/413
See application file for complete search history.

(56) References Cited

U.S. PATENT DOCUMENTS

| | | | | | |
|---|---|---|---|---|---|
| 3,307,064 A | * | 2/1967 | Delphin | .............. | H01J 23/0876 315/3.5 |
| 4,143,207 A | * | 3/1979 | Itakura | .................... | C04B 35/47 252/520.21 |
| 4,307,403 A | * | 12/1981 | Yamada | .................. | H01Q 15/22 343/755 |
| 4,323,617 A | * | 4/1982 | Mandai | ................. | H01G 4/1281 252/62.3 BT |
| 4,326,617 A | * | 4/1982 | Mochida | ................. | F16C 1/226 192/111.11 |
| 4,670,409 A | * | 6/1987 | Okawa | .................. | C04B 35/465 501/135 |
| 4,888,246 A | * | 12/1989 | Kuwata | ................. | C23C 14/088 204/192.15 |
| 5,136,270 A | * | 8/1992 | Hatanaka | .................. | H01P 7/10 333/219.1 |

(Continued)

FOREIGN PATENT DOCUMENTS

| | | |
|---|---|---|
| CN | 1384079 A | 12/2002 |
| CN | 101522460 A | 9/2009 |

(Continued)

OTHER PUBLICATIONS

Subodh et al., "Dielectric Response of High Permittivity Polymer Ceramic Composite with Low Loss Tangent", Applied Physics Letters, vol. 95, Issue 6, pp. 062903-062903-3, Aug. 10, 2009.

(Continued)

*Primary Examiner* — Rexford Barnie
*Assistant Examiner* — Elim Ortiz
(74) *Attorney, Agent, or Firm* — Peter T. DiMauro; Armstrong Teasdale LLP (57) ABSTRACT

A power transfer system is provided. The power transfer system includes a field-focusing element including a dielectric material. The dielectric material includes a ceramic material and a polymer material. The ceramic material includes an oxide compound comprising titanium and the polymer material includes a resin.

5 Claims, 4 Drawing Sheets

(56) References Cited

U.S. PATENT DOCUMENTS

| | | | | |
|---|---|---|---|---|
| 5,750,264 | A * | 5/1998 | Ueno | C04B 35/47 428/426 |
| 6,204,597 | B1 * | 3/2001 | Xie | H01J 3/022 313/309 |
| 6,268,054 | B1 * | 7/2001 | Costantino | C01G 23/006 428/403 |
| 6,300,267 | B1 | 10/2001 | Chen et al. | |
| 6,436,332 | B1 * | 8/2002 | Fasano | C03C 14/004 264/614 |
| 6,544,651 | B2 | 4/2003 | Wong et al. | |
| 6,641,940 | B1 * | 11/2003 | Li | C04B 35/4682 428/701 |
| 6,905,989 | B2 * | 6/2005 | Ellis | B32B 18/00 501/134 |
| 6,936,559 | B2 * | 8/2005 | Li | C01G 23/002 315/5.46 |
| 6,970,055 | B2 * | 11/2005 | Toncich | G01R 27/2694 257/595 |
| 7,029,971 | B2 | 4/2006 | Borland et al. | |
| 7,294,598 | B2 * | 11/2007 | Brize | C01G 23/002 264/614 |
| 7,413,967 | B2 * | 8/2008 | Dupuis | H01L 21/0262 257/E21.102 |
| 7,465,497 | B2 * | 12/2008 | Tan | B82Y 30/00 427/212 |
| 7,672,113 | B2 | 3/2010 | Pramanik et al. | |
| 7,741,396 | B2 | 6/2010 | Tan et al. | |
| 7,870,664 | B2 | 1/2011 | Das et al. | |
| 8,013,316 | B2 * | 9/2011 | Eleftheriades | B23K 26/38 219/121.71 |
| 8,193,886 | B2 | 6/2012 | Hahn et al. | |
| 8,244,083 | B2 * | 8/2012 | Seidman | A61B 18/1815 385/31 |
| 8,736,128 | B2 * | 5/2014 | Dede | H02K 29/03 310/191 |
| 8,766,092 | B2 * | 7/2014 | Peng | G02B 5/1809 136/259 |
| 8,797,702 | B2 * | 8/2014 | Banerjee | G02B 1/002 361/143 |
| 9,013,068 | B2 * | 4/2015 | Ryu | H02J 17/00 307/104 |
| 2002/0132898 | A1 | 9/2002 | Takaya | H01B 3/442 524/445 |
| 2004/0063566 | A1 | 4/2004 | Gaspers et al. | |
| 2005/0110641 | A1 * | 5/2005 | Mendolia | G01S 5/04 340/572.7 |
| 2005/0207094 | A1 | 9/2005 | Borland et al. | |
| 2005/0256240 | A1 * | 11/2005 | Nelson | B82Y 30/00 524/430 |
| 2007/0060672 | A1 * | 3/2007 | Kumashiro | H01B 3/30 523/220 |
| 2007/0121274 | A1 * | 5/2007 | Talvacchio | H01G 4/1218 361/311 |
| 2008/0028940 | A1 | 2/2008 | Han et al. | |
| 2008/0128961 | A1 | 6/2008 | Slenes et al. | |
| 2008/0218940 | A1 * | 9/2008 | Singh | C01G 23/002 361/524 |
| 2009/0058189 | A1 * | 3/2009 | Cook | H04B 5/0037 307/104 |
| 2009/0075119 | A1 * | 3/2009 | Zhang | C04B 35/4682 428/697 |
| 2009/0128262 | A1 * | 5/2009 | Lee | H01Q 9/0485 333/219.1 |
| 2009/0153275 | A1 | 6/2009 | Lee et al. | |
| 2009/0297804 | A1 * | 12/2009 | Paul | C01G 23/006 428/210 |
| 2009/0303154 | A1 * | 12/2009 | Grbic | B82Y 20/00 343/909 |
| 2010/0000769 | A1 | 1/2010 | Ohmi et al. | |
| 2010/0065352 | A1 * | 3/2010 | Ichikawa | B60L 11/182 180/65.8 |
| 2010/0328044 | A1 * | 12/2010 | Waffenschmidt | H02J 7/025 340/10.4 |
| 2011/0034606 | A1 * | 2/2011 | Park | H01G 4/206 524/403 |
| 2011/0121778 | A1 * | 5/2011 | Oyobe | B60L 5/005 320/108 |
| 2011/0133569 | A1 * | 6/2011 | Cheon | H02J 17/00 307/104 |
| 2011/0140429 | A1 * | 6/2011 | Bohori | H01F 38/18 290/44 |
| 2011/0163827 | A1 * | 7/2011 | Kanno | H01G 4/255 333/185 |
| 2011/0231029 | A1 | 9/2011 | Ichikawa et al. | |
| 2011/0234010 | A1 | 9/2011 | Bohori et al. | |
| 2011/0278940 | A1 * | 11/2011 | Krishna | C04B 35/462 307/104 |
| 2012/0015198 | A1 * | 1/2012 | Masukawa | B32B 18/00 428/446 |
| 2012/0032521 | A1 * | 2/2012 | Inoue | B60L 11/123 307/104 |

FOREIGN PATENT DOCUMENTS

| | | |
|---|---|---|
| CN | 101602892 A | 12/2009 |
| EP | 0571948 B1 | 2/2000 |
| EP | 1113459 A2 | 7/2001 |
| JP | 4946197 A | 5/1974 |
| JP | 5654024 A | 5/1981 |
| JP | 8069712 A | 3/1996 |
| JP | 2005132698 A | 5/2005 |
| JP | 2005200232 A | 7/2005 |
| JP | 2009126742 A | 6/2009 |
| WO | 2004004118 A1 | 1/2004 |
| WO | 2008150262 A1 | 12/2008 |
| WO | 2009031639 A1 | 3/2009 |
| WO | 2010035321 A1 | 4/2010 |
| WO | 2010036980 A1 | 4/2010 |

OTHER PUBLICATIONS

Unofficial translation of Chinese Search Report issued from corresponding CN Application No. 201210266107.1 dated May 14, 2015.

Non-Final Office Action, U.S. Appl. No. 13/560,259 dated Jan. 6, 2016, 8 pages.

Unofficial translation of Chinese Office Action and Search Report issued in connection with corresponding CN Application No. 201210266107.1 dated Jan. 7, 2016.

Search Report and Written Opinion from corresponding EP Application No. 12177118.2-1811 dated Feb. 27, 2013.

Su, B. et al., "Microstructure and dielectric properties of Mg-doped barium strontium titanate ceramics", Journal of Applied Physics, American Institute of Physics. New York, US, vol. 95, No. 3, pp. 1382-1385, Feb. 1, 2004.

Mei-Feng, Hu et al., "Study on dielectric and tunable properties of Cr-doped BaO.6SrO.4TiO3 thin films by rf sputtering", Journal of Materials Science, Kluwer Academic Publishers, BO, vol. 43, No. 9, pp. 3162-3165, Mar. 11, 2008.

Xianghui, Zhou et al., "Characterization of metal (Fe, Co, Ni, Cu) and fluorine codoped barium strontium titanate thick-films for microwave applications", Journal of Electroceramics, Kluwer Academic Publishers, BO, vol. 24, No. 4, pp. 345-354, May 30, 2009.

Zhao et al., "BST Iron Shift Phase Instrument and its High Frequency Dielectric Material Performance Test Study", China's Outstanding Master's Thesis, pp. 1-78, Dec. 31, 2007.

Unofficial translation of Chinese Search Report from corresponding CN Application No. 201210266107.1 dated May 14, 2015.

Herner et al., "The Effect of Various Dopants on the Dielectric Properties of Barium Strontium Titanate", Materials Letters, vol. No. 15, Issue No. 5-6, pp. 317-324, Jan. 1993.

Cao et al., "Application of Polymer/Inorganic Composite Material in Dielectric Material Field", China Academic Journal Electronic Publishing House, 4 Pages, Aug. 2003.

(56) References Cited

OTHER PUBLICATIONS

Wang et al., "Preparation and Characterization of Nitrogen Doped SrTiO3 Photocatalyst", Science Direct, Journal of Photochemistry and Photobiology A: Chemistry, pp. 149-156, vol. No. 165, 2004.
Zang et al., "Grain Boundary Effect on the Dielectric Properties of CaCu3Ti4O12 Ceramics", Journal of Physics D: D: Applied Physics, vol. No. 38, pp. 1824-1827, 2005.
Grubbs et al., "Dielectric and Magnetic Properties of Fe- and Nb-Doped CaCu3Ti4O12", Physical Review B, vol. No. 72, Issue No. 104111, pp. 1-11, Sep. 23, 2005.
Zhou et al., "Dielectric Properties of Bismuth Doped BST/MT Composites", Piezoelectricity and Acoustooptic, vol. No. 27, Issue No. 6, pp. 668-670, 687, Dec. 2005.
Qin et al., "Dielectric Properties of (Ba, Sr, Ca)TiO3 Ceramics for Tunable Microwave Devices", Applications of Ferroelectrics, 15th IEEE International Conference Symposium, Sunset Beach, NC, USA, 4 pages, Jul. 30-Aug. 3, 2006.
Li et al., "Low Dielectric Loss and Enhanced Tunable Properties of Cr-Doped Barium Strontium Titanate Solid Solution", Journal of Materials Science: Materials in Electronics, vol. No. 17, Issue No. 8, pp. 587-591, Aug. 2006.
Din et al.,"Dielectric Properties of Cr2O3 Doped (Ba,Sr,Ca)TiO3 Ceramics for Tunable Microwave Devices", Materials Research Society, Materials Research Society. Symp. Proc, vol. No. 966, 7 Pages, 2007.
Manoj et al., "Effect of Dopants on the Low Temperature Microwave Dielectric Properties of Ba(Zn1/3Ta2/3)O3 Ceramics", Journal of Materials Science: Materials in Electronics, vol. No. 18, Issue No. 4, pp. 441-446, Apr. 2007.
Shao et al.,"High Permittivity and Low Dielectric Loss in Ceramics with the Nominal Compositions of CaCu3—xLa2x/3Ti4O12", Applied Physics Letters, vol. No. 91, Issue No. 042905, 3 Pages, Jul. 25, 2007.
Xing et al., "Bismuth Nanoprecipitation at Grain Boundaries During Microstructural Evolution in (Sr,Ba)TiO3 Ceramics", Science Direct Acta Materialia , vol. No. 55, Issue No. 16, pp. 5323-5332, Sep. 2007.
Choi et al., "Effect of Al Doping on the Electric and Dielectric Properties of CaCu3Ti4O12", Journal of the American Society, vol. No. 90, Issue No. 12, pp. 4009-4011, Sep. 21, 2007.
Gao et al., "Surface Chemical Composition and Optical Properties of Nitrogen-Doped Ba0.6Sr0.4TiO3 Thin Films", Journal of Applied Physics, vol. No. 102, Issue No. 064106, pp. 1-7, Sep. 26, 2007.
Choi et al., "Effect of Al Doping on the Electric and Dielectric Properties of CaCu3Ti4O12", Journal of the American Ceramic Society, vol. No. 90, Issue No. 12, pp. 4008-4011, Dec. 2007.
Kwon et al., "The Effect of Cr2O3, Nb2O5 and ZrO2 Doping on the Dielectric Properties of CaCu3Ti4O12", Science Direct, Materials Letters, vol. No. 62, Issue No. 4-5, pp. 633-636, Feb. 2008.
Yu et al., "Dielectric Properties of CaCu3Ti4O12 Ceramics Modified by SrTiO3", Science Direct, Materials Letters, vol. No. 62, Issue No. 8-9, pp. 1353-1355, Mar. 31, 2008.
Shengwen et al., "The Dielectric Properties of Ba0.6Sr0.4CrxTi1-xO3 Thin films Prepared by Pulsed Laser Deposition", IEEE Transactions on Ultrasonics, Ferroelectrics, and Frequency Control, vol. 55, Issue No. 5, pp. 1029-1033, May 2008.
Mazni et al., "AC Conductivity of Ca1—xAxCu3Ti4O12 (A=Sr or Ba) with x=0.0 and 0.2. CERAMICS", Solid State Science and Technology Society, vol. No. 17, Issue No. 1, pp. 222-228, 2009.
Smith et al., "An Anion Substitution Route to Low Loss Colossal Dielectric CaCu3Ti4O12" Journal of Solid State Chemistry, vol. No. 182, Issue No. 2, pp. 409-411, Feb. 2009.
Schmidt et al., "Anomalous Increase of Dielectric Permittivity in Sr-Doped CCTO Ceramics Ca1—xSrxCu3Ti4O12 (0 ex e 0.2)", Chemistry of Materials Communication, vol. No. 22, Issue No. 01, pp. 6-8, 2010.
Li et al., "Enhanced Dielectric Properties and Sinterability of CaCu3Ti4O12 Ceramics by Sr2+ Doping", Physica B: Condensed Matter, vol. No. 405, Issue No. 4, pp. 1193-1196, Feb. 15, 2010.
Kong et al., "Electrically Tunable Dielectric Materials and Strategies to Improve their Performances", Progress in Materials Science, vol. No. 55, Issue No. 8, pp. 840-893, Nov. 2010.
European Search Report & Opinion issued in connection with related EP Application No. 11165079.2 dated Oct. 14, 2011.
European Search Report & Opinion issued in connection with related EP Application No. 11165080.0 dated Oct. 14, 2011.
US Non-Final Office Action issued in connection with related U.S. Appl. No. 13/075,911 dated Mar. 29, 2013.
U.S. Non-Final Office Action issued in connection with related U.S. Appl. No. 12/778,166 dated Jul. 25, 2013.
U.S. Non-Final Office Action issued in connection with related U.S. Appl. No. 12/778,166 dated Feb. 7, 2014.
Chinese Office Action issued in connection with related CN Application No. 201110134150.8 dated Apr. 2, 2014.
Chinese Office Action issued in connection with related CN Application No. 201110134191.7 dated Apr. 2, 2014.
Unofficial English Translation of Japanese Office Action issued in connection with related JP Application No. 2011103930 dated Sep. 24, 2014.
U.S. Non-Final Office Action issued in connection with related U.S. Appl. No. 12/778,166 dated Jan. 22, 2015.
Japanese Office Action issued in connection with related JP Application No. 2011103929 dated Feb. 3, 2015.
European Office Action issued in connection with related EP Application No. 11165079.2 dated Mar. 18, 2015.
Unofficial English Translation of Japanese Notice of Allowance issued in connection with related JP Application No. 2011103930 dated Aug. 4, 2015.
Unofficial English Translation of Japanese Notice of Allowance issued in connection with related JP Application No. 2011103929 dated Aug. 25, 2015.
European Search Report & Opinion issued in connection with related EP Application No. 16179677.6 dated Dec. 12, 2016.

* cited by examiner

DIELECTRIC MATERIALS FOR POWER TRANSFER SYSTEMS

BACKGROUND OF THE INVENTION

Embodiments of the present invention relate generally to power transfer systems, and, in particular, to resonance based contactless power transfer systems.

In certain applications where instantaneous or continuous energy transfer is needed but interconnecting wires are inconvenient, contactless power transfer is desirable. One contactless power transfer method is an electromagnetic induction method that works on the principle of a primary transformer coil generating a dominant magnetic field and a secondary transformer coil in the vicinity of the primary transformer coil generating a corresponding voltage. The magnetic field received by the secondary transformer coil decreases as a function of the square of the distance between the two coils, and hence the coupling between primary and secondary coils is weak for distances greater than a few millimeters.

Another method of contactless power transfer attempts to increase the efficiency of the inductive power transfer by resonant inductive coupling. Transmitter and receiver elements resonate at the same frequency, and maximum induction occurs at the resonant frequency. However, such resonant induction is sensitive to load and gap variations.

There is a need for an efficient contactless power transfer system that may operate with coils separated by longer distances than are presently acceptable and is efficient when subjected to misalignment or load variations. Further, there is a need for accommodating and efficient materials having high dielectric properties and low dielectric loss factors, and robust design that can be cost effectively manufactured and used in the power transfer systems for the required frequency ranges.

BRIEF DESCRIPTION OF THE INVENTION

Briefly, in an embodiment, a power transfer system is provided. The power transfer system includes a field-focusing element including a dielectric material. The dielectric material includes a ceramic material and a polymer material. The ceramic material includes an oxide compound comprising titanium and the polymer material includes a resin.

In an embodiment, a power transfer system is provided. The power transfer system comprises a first coil coupled to a power source and a second coil coupled to a load; and a field-focusing element including a dielectric material and disposed between the first coil and the second coil. The dielectric material includes an oxide compound comprising titanium and a polymer material includes a resin.

In another embodiment, a power transfer system is provided. The power transfer system comprises a first coil coupled to a power source and a second coil coupled to a load; and a field-focusing element including a resonator. The resonator includes a plurality of layers, comprising a dielectric layer and a metallic layer. The resonator is configured in a Swiss-roll form, where the neighboring dielectric layers are separated by the metallic layer, and the dielectric layer includes a dielectric material. The dielectric material includes a ceramic material and a polymer material. The ceramic material includes an oxide compound comprising titanium and the polymer material includes a resin.

In another embodiment, a method of forming a power transfer system is provided. The method includes forming a resonator. Forming a resonator includes the steps of disposing a metallic layer, blending a ceramic material and polymer material to form a dielectric material, depositing the dielectric material over the metallic layer to form a dielectric layer, forming a Swiss-roll structure of metallic layer and dielectric layer, and curing the Swiss-roll structure to form a monolithic Swiss-roll structure.

BRIEF DRAWINGS OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Embodiments of the present invention include power transfer systems and the dielectric materials that can be used for power transfer systems.

In the following specification and the claims that follow, the singular forms "a", "an" and "the" include plural referents unless the context clearly dictates otherwise.

Contactless power transfer systems are typically characterized by short distance power transfer between primary and secondary coils. For example, one embodiment of an inductive power transfer system uses a primary coil and a secondary coil to transfer power between two circuits in galvanic isolation. A magnetic field is established around the primary coil when coupled to a power source. The quantity of power transferred from the primary coil to the secondary coil is proportional to the level of primary magnetic field linking the secondary coil. Electrical transformers use high permeability magnetic cores to link the magnetic field between primary and secondary coils and thus achieve efficiencies on the order of at least about 98%. However, when such systems are configured for contactless power transfer, the air gap between the two coils reduces the magnetic field coupling. Such reduced coupling affects efficiency of contactless power transfer systems.

Certain embodiments disclosed herein provide a robust contactless power transfer system with reduced sensitivity to load variations, efficient power transfer during misalignment of coils, and a field-focusing structure that enhances power transfer efficiency.

Figure 1:
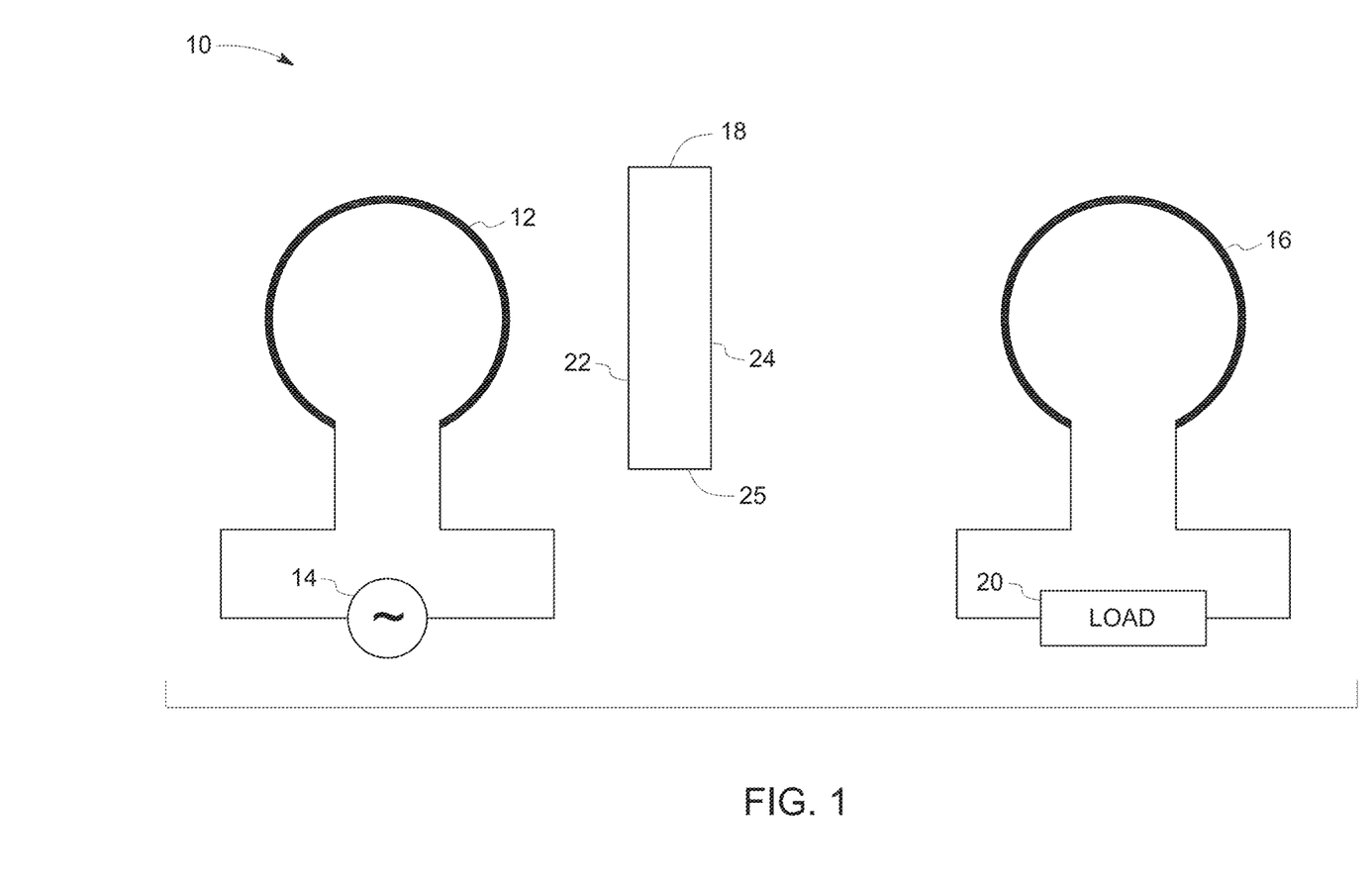
FIG. 1 illustrates an exemplary contactless power transfer system according to an embodiment of the invention.
Figure 5:
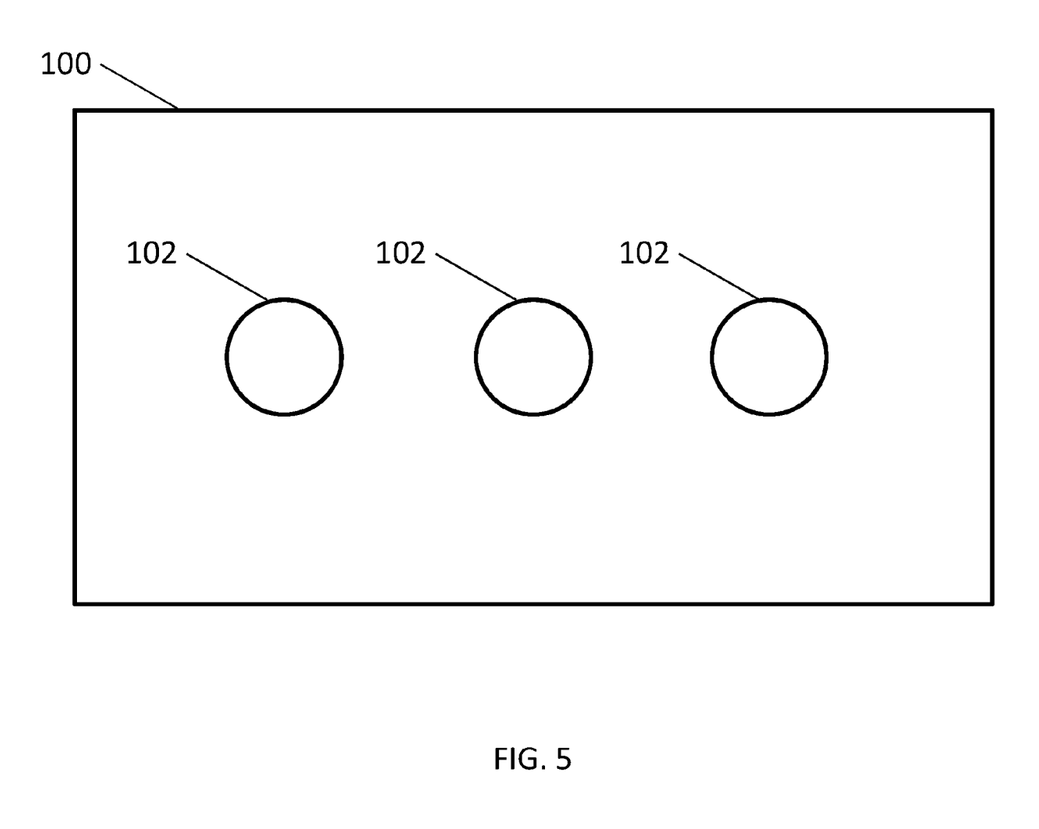
FIG. 5 illustrates an exemplary field-focusing element including a plurality of resonators.

FIG. 1 illustrates an example of a contactless power transfer system 10 according to an embodiment of the invention including a first coil 12 coupled to a power source 14 and configured to produce a magnetic field (not shown). A second coil 16 is configured to receive power from the first coil 12. As used herein, the term "first coil" may also be referred to as a "primary coil," and the term "second coil" may also be referred to as a "secondary coil." The primary and secondary coils can be made up of any good electrical conducting materials such as, for example, copper. Field-focusing element 18 is disposed between the first coil 12 and the second coil 16 for focusing the magnetic field from power source 14. In another embodiment, the field-focusing element may be used to focus electric fields and/or electromagnetic fields. The terms "magnetic field-focusing element" and "field-focusing element" are used interchangeably. In one embodiment, magnetic field-focusing element 18 is configured as a self-resonant coil and has a standing wave current distribution when excited via the first coil. In another embodiment, the magnetic field-focusing element includes multiple resonators operating as an active array or a passive array and each resonator configured as a self-resonant coil with a standing wave current distribution. In yet another embodiment, the magnetic field-focusing element includes multiple sets of such resonators, each such resonator set excited at a particular phase. For example, FIG. 5 illustrates a field-focusing element 100 (such as field-focusing element 18 shown in FIG. 1) including multiple resonators 102. It may be appreciated that, when exciting the sets of resonators via different phases, field-focusing may be enhanced in a desired direction.

Magnetic field-focusing element 18 is further configured to focus the magnetic field onto the second coil 16 enhancing the coupling between the first coil 12 and the second coil 16. In one embodiment, a non-uniform magnetic field distribution is developed around magnetic field-focusing element 18 by creating a standing wave current distribution in the field-focusing element 18. In the illustrated embodiment, field-focusing element 18 is placed closer to the first coil 12 as an example. It may be advantageous in certain systems to place the field-focusing element 18 closer to the second coil 16. A load 20 is coupled to the second coil 16 to utilize the power transferred from the power source 14. In certain embodiments, the contactless power transfer system 10 may also be configured to simultaneously transfer power from the second coil to the first coil such that the system is capable of bidirectional power transfer. Non-limiting examples of potential loads include a bulb, a battery, a computer, a sensor, or any device that requires electrical power for operation.

The contactless power transfer system 10 may be used to transfer power from the power source 14 to the load 20. In one embodiment, the power source 14 comprises a single-phase AC power generator or three-phase AC power generator in combination with power conversion electronics to convert the AC power to a higher frequency. When the first coil 12 is excited at the resonant frequency of magnetic field-focusing element 18, a standing wave current distribution is developed within the magnetic field-focusing element 18 between two open ends (22, 24) of the field-focusing element. The standing wave current distribution leads to a non-uniform magnetic field distribution around magnetic field-focusing element 18. Such non-uniform current distribution is configured to focus magnetic field in any desired direction, such as, in a direction of the second coil 16 in this example. When operating at resonant frequency, even a small excitation to magnetic field-focusing element 18 produces large amplitude of current distribution along the length 25 of the magnetic field-focusing element. This large current magnitude of non-uniform distribution leads to an amplified and focused magnetic field in the direction of second coil 16 that results in higher efficiency of power transfer.

Figure 2:
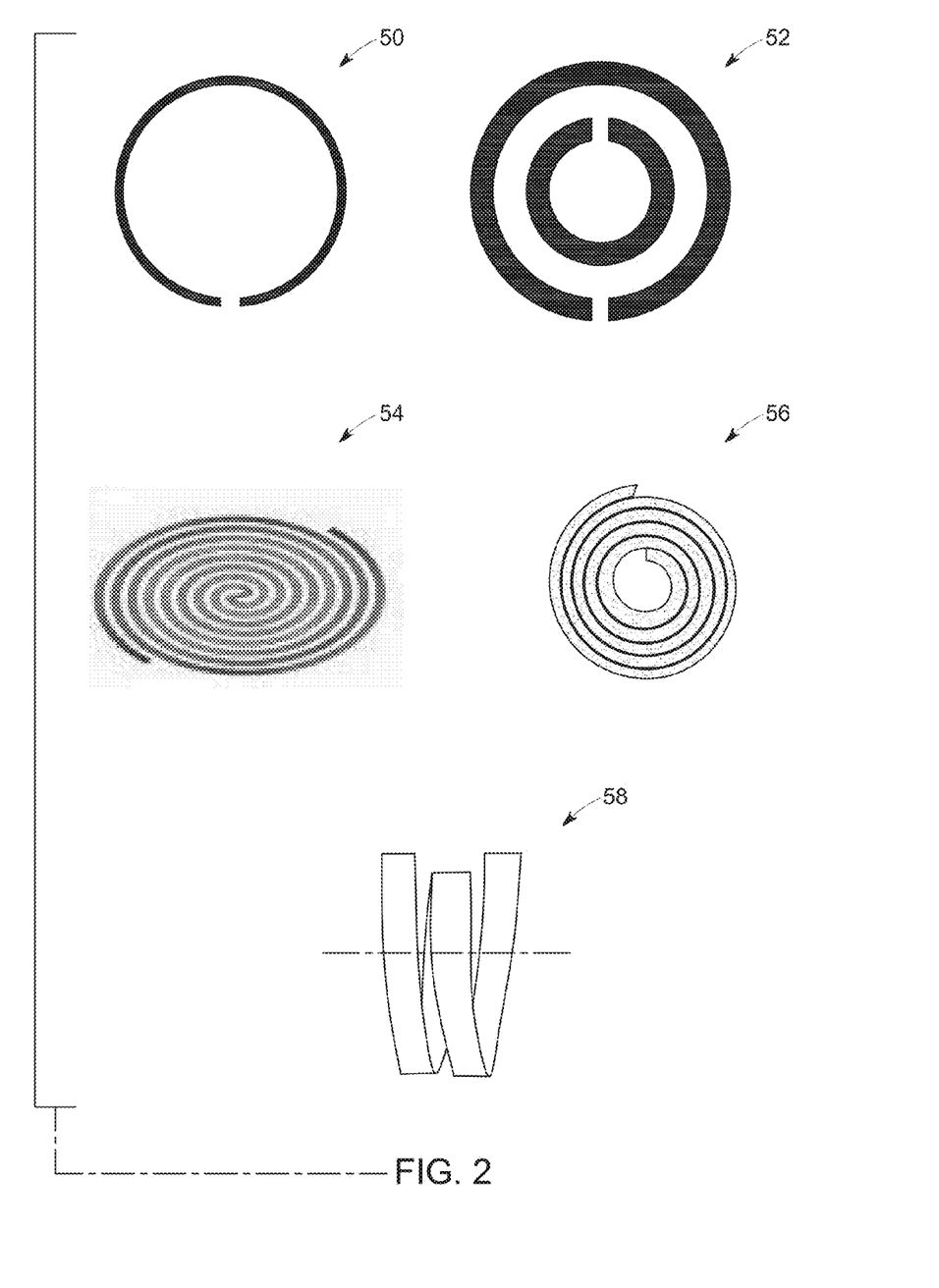
FIG. 2 illustrates multiple exemplary structures of field-focusing elements according to various embodiments of the invention.

FIG. 2 illustrates multiple examples of structures for field-focusing elements according to various embodiments of the invention. In one embodiment, the field-focusing element includes a single loop coil 50. In another embodiment, the field-focusing element includes multiple turns such as in a split ring structure 52, spiral structure 54, Swiss-roll structure 56, or helical coil 58. Selection of a structure for a particular application is determined by the size and self-resonating frequency of the field-focusing element. For example, in low power applications (less than about 1 Watt, for example), a resonance frequency up to about 1000 MHz is feasible. In high power applications (from about one hundred Watts to about 500 kilowatts, for example), the resonance frequency of the order of several hundred kHz is feasible.

In one embodiment, the field-focusing element 18 comprises a self-resonant coil that focuses the magnetic field upon excitation at the resonant frequency. The resonator is self-resonant coil of any shape whose self-resonant frequency depends upon the self-capacitance and self-inductance. The self-resonant frequency of the coil is dependent on the coil geometrical parameters. For example, in the case of helical resonator coil, the resonance frequency is such that the overall length of the helix is half wavelength or multiples of half wavelengths of electromagnetic excitation. As a result, design of these resonators at low frequencies is challenging due to the space constraints. One of the methods to miniaturize the size of resonators is to embed the resonator in a high dielectric constant medium.

In one embodiment, a resonator or an array of resonators of the field-focusing element 18 is embedded in a material having high dielectric constant or a magnetic material having high permeability or magneto-dielectric medium having high dielectric permittivity and high magnetic permeability to achieve lower resonant frequency with a smaller sized resonator. High permeability material enhances self-inductance of the resonator and high permittivity material enhances self-capacitance of the resonators to reduce the frequency of resonance. In another embodiment, high permeability materials are also configured to increase the coupling between the primary coil and the field-focusing element, and between the field-focusing element and the secondary coil.

When the resonator is embedded in dielectric medium the inter-turn capacitance between the turns of the coil increases which in turn helps to reduce the resonant frequency of the resonator. With high dielectric constant, size reduction of the resonator is possible to a great extent. Another advantage of high dielectric constant is the confinement of electric field within the resonator, improving the efficiency of power transfer as the radiation losses are diminished. But one of the design criteria of the selection of material with high dielectric constant is the loss tangent of that material at the operating frequency. The low dielectric loss tangent ensures the maximum coupling efficiency. If the loss tangent is high, the loss in the form of heat will be high in the resonator.

Power transfer systems enabled through embedding resonator in high dielectric constant and low loss tangent materials have applications including electric vehicles charger, power transfer to rotating load, contactless charging of mining vehicles, where the power transfer levels are on the order of a few kW. Power transfer systems having high dielectric constant and high loss dielectric materials can be used in applications like subsea connectors, where the power levels are few milliwatts.

Figure 3:
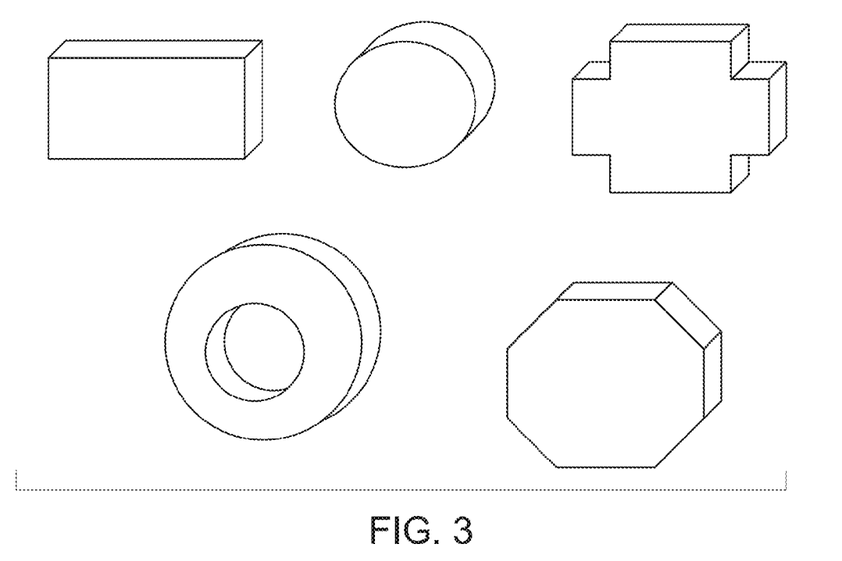
FIG. 3 illustrates multiple exemplary structures of embedding materials according to an embodiment of the invention.

High dielectric constant materials with different shapes can act as embedding material for the resonator. For example, a high dielectric constant circular dielectric disc can act as an embedding material for the resonator at certain frequencies. The resonant frequency in this case is determined by the geometrical configuration of the resonator and embedding material. Non limiting examples of the different shapes that can be used as field-focusing elements are given in FIG. 3.

In one embodiment, the dielectric material is used as a bulk material for embedding the resonator. The term "bulk material" as used herein indicates any material that has a three dimensional structure with all of the sides greater than about 1 mm. In one embodiment, the dielectric materials are used as coatings. The coating can be in a thin film form or in a thick film form. As used herein a "thin film" has a thickness less than about 100 microns, while a thick film can have thickness from about a hundred microns to about a millimeter.

In one embodiment, a high dielectric constant material is used as a thin film or thick film coating on a metal resonator surface to create a field focusing structure like Swiss-roll structure 56, for example. The high dielectric constant between the different layers of the Swiss-roll increases the capacitance of the structure and thereby reducing the frequency considerably.

Embedding resonator material in high dielectric constant materials generally involves some processing of the resonator and embedding materials together. For example, formation of a compact metallic and ceramic layer combination includes many processing challenges. The difference in melting, sintering, or softening points of different metals and ceramics may hinder achievement of the desired properties of the resonator. Thermal expansion difference and differing sintering behaviors may induce cracks or gaps in the compact structure.

The material behavior may change in the presence of other materials. For example, if a metal resonator material and a ceramic dielectric material are to be processed together for the formation of a resonator structure, the processing conditions may have to be designed to retain the metallic behavior of the resonant material without excessive oxidation, while simultaneously processing the ceramic dielectric material to provide the required physical strength to the field focusing element structure. Generally, the ceramic materials are sintered at high temperature to develop the physical strength of the structure. However, sintering the ceramic materials at high temperature may increase particle size of the ceramic material, thereby probably reducing the dielectric property of the ceramic material.

Therefore, it is beneficial to consider resonator materials and high dielectric constant materials that are amenable to process together. Further, a low-temperature processing method is desired to process the resonator materials embedded in the high-dielectric constant dielectric materials.

In one embodiment, a combination of materials can be used for embedding the resonators. For example, a mixture of two or more materials having high dielectric constant or two or more materials having high permeability can be used as the embedding material. In another embodiment, a mixture of two or more materials, each having a high dielectric constant or a high permeability can be used as the embedding material.

Mixing ceramic dielectric materials with polymers, without unduly compromising on the dielectric properties of the ceramic materials, may be one way of imparting low-temperature processability to the ceramic dielectric materials along with the metal resonator materials. Accordingly, hereby a field-focusing element including a dielectric material is presented such that the dielectric material includes a ceramic material and a polymer material. The ceramic material is configured to have high dielectric constant and low dielectric loss at the desired frequency ranges. In one embodiment, the ceramic material comprises an oxide compound comprising titanium. In a further embodiment, the oxide compound is selected from the group consisting of titania, titanate, fluoride doped titania, and fluoride doped titanate. In one embodiment, the oxide compound includes a compound represented by the formula $(Ba_{1-x-y}Sr_xMg_y)_zTiO_{(2+z-\delta)}F_{2\delta}$, wherein $0 \le x \le 1$, $0 \le y \le 1$, $0 \le (x+y) \le 1$, $z=0$ or $1 \le z \le 2$, and $0 \le \delta \le 1$.

As used herein the formula $(Ba_{1-x-y}Sr_xMg_y)_zTiO_{(2+z-\delta)}F_{2\delta}$ is a theoretical formula including the mixtures and compounds that are in the specified ratio to be denoted by this formula, and does not necessarily mean that a single compound exists in this form that can be identified by standard characterization techniques. In short, a material specified by the above formula may actually exist as multiple phases which, taken collectively, have an overall composition as specified by the formula.

One of the oxide compounds that can be combined with a polymer and has beneficial dielectric properties at the 1 MHz to 10 MHz range and suited for the field-focusing element is titania ($TiO_2$). Magnesium titanate ($MgTiO_3$), and strontium titanate ($SrTiO_3$) are two of the titanates that are particularly suited for the field-focusing elements that can be beneficially used at the frequency ranges up to about 10 MHz. In one embodiment, a fluoride doped barium strontium titanate ($Ba_{1-x}Sr_xTiO_{3-\delta}F_{2\delta}$), wherein $0 \le x \le 1$, and $0 \le \delta \le 1$, is used as one of the ceramic materials.

The polymer part of the dielectric material may include any polymer that can be mixed with the ceramic material and processed for the required designs and shapes of the field-focusing elements and withstand the application environments. In one embodiment, the polymer material is a resin, such as polytetrafluoroethylene (PTFE) or epoxy resin. These resins provide good processability at low temperature for the ceramic dielectric materials without substantially lowering the beneficial dielectric properties of the ceramic materials.

A particular application of the dielectric materials may influence the balance of properties selected for the material. For example, in some applications, a high dielectric constant may be more desired than having low dielectric loss tangent values. In some other applications, a lower dielectric constant may be tolerated, if a low dielectric loss tangent value is important for the application. In the particular application of field focusing element in a wireless power transmission application, a dielectric constant value of greater than 10 may be acceptable; the relatively low dielectric loss tangent values generally associated with materials having such a relatively low minimum dielectric constant may still provide a net performance benefit. Polymer addition to the ceramic dielectric material as described herein is considered to be lowering the beneficial dielectric properties of the ceramic dielectric material if the polymer addition reduces the dielectric constant below 10 or increases the loss tangent more than 10% of the loss tangent value of the ceramic material without the polymer addition.

By combining the ceramic materials with polymeric resins in forming the dielectric material of the field-focusing element, the ceramic dielectric materials were able to be used in small particle sizes, compared to the ceramic materials that would have been processed without combining with the polymeric resins. In one embodiment, the ceramic materials used are in powder form and have a particle size in the range from about 5 nm to about 50 μm. In a further embodiment, the particle size of the ceramic dielectric material used is in the range from about 10 nm to about 100 nm.

Figure 4:
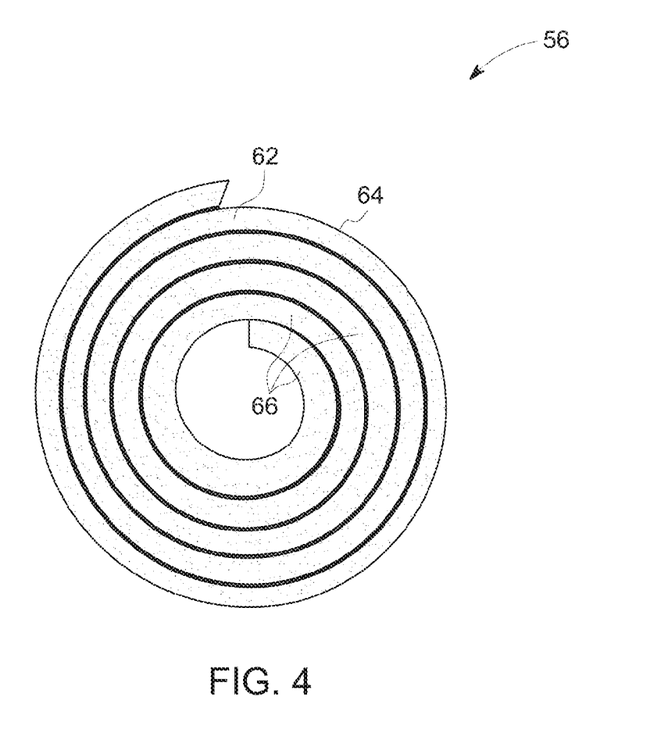
FIG. 4 illustrates example of Swiss-roll structure, according to an embodiment of the invention.

In one embodiment, a field-focusing element comprises a resonator in the form of a Swiss-roll structure 56 as depicted in FIG. 4. The resonator includes a metallic layer 62 and a dielectric layer 64. The Swiss-roll structure has a plurality of turns 66. A "turn" is hereby defined as a combined winding of one dielectric layer and at least one metallic layer. In one embodiment the Swiss-roll structure is limited to 2 turns 66, while in various other embodiments, the Swiss-roll structure has more than 2 turns as depicted in FIG. 4. In one embodiment, the Swiss-roll structure 60 has up to about 100 turns.

In one embodiment, the metal resonator layer (metallic layer) 62 includes copper, silver, aluminum, iron, gold, nickel, palladium, indium, gallium, zinc, lead, tin, platinum, or any combination of the foregoing materials. In a particular embodiment, the metallic layer 62 is made up of one or more materials selected from the group consisting of copper, silver, aluminum, or any combination thereof. In an illustrative system, the metallic layer 62 comprises copper. In some embodiments, the metallic layer 62 can further have a silver or gold plating of a few micro meters to a few tens of micro meters to reduce the skin resistance losses.

The dielectric materials with a ceramic material and polymer material may be used as the embedding materials in the form of dielectric layer 64 of Swiss-roll structure 56. In one embodiment, the dielectric layer 64 is a high permittivity ceramic material with dielectric constant of at least about 10 and dielectric loss tangent less than about 0.01 in the frequency range of about 1 KHz to about 100 MHz.

The structure including alternating metallic layer 62 and dielectric layer 64 in Swiss-roll form provides for high distributed capacitance and inductance that helps in achieving lower resonance frequency with the given size of resonator. Use of high dielectric permittivity material further reduces the resonance frequency. The thickness of dielectric layer 64 is a compromise between the increased capacitance with thinner layer verses reduced electrical breakdown strength. Similarly, the thickness of metallic layer is a function of current handling capacity and skin resistance losses.

Accordingly, in one embodiment, the metallic layer 62 has a thickness in the range from about 0.1 mm to about 10 mm. In a particular embodiment, the thickness of the metallic layer 62 is in the range from about 1 mm to about 10 mm.

The thickness of the dielectric layer 64 varies depending on the required resonating frequencies of the field focusing Swiss-roll element. In one embodiment, the dielectric layer 64 has a thickness in the range from about 0.01 mm to about 10 mm. In a particular embodiment, the thickness of the dielectric layer 64 is in the range from about 0.1 mm to about 1 mm.

Depending on the application, the Swiss-roll structured resonator may be configured in various sizes. In one embodiment, the resonator is configured to have an inner diameter 60 (FIG. 4) of the Swiss-roll in a range from about 5 mm to about 100 cm and the outer diameter 62 in a range from about 5 mm to about 300 cm.

In one embodiment, the Swiss-roll structure including a dielectric and metallic layer with multiple turns is formed using a combined processing of the layers. As a part of the process, in the initial step, a metallic layer 62 is disposed. The metal substrate may be a self-standing metal strip or film or a layer of metallic powder or slurry disposed on a supporting sacrificial layer such as a polymer tape, for example a cellophane or polyurethane tape. In one embodiment, the method of forming a Swiss-roll structure includes blending the ceramic and polymer material to form the dielectric material and depositing the dielectric material on the metallic layer 62 to form a dielectric layer 64.

In one embodiment, the resultant multilayered assembly is further laminated or cold-isostatically pressed. The combined metal layer 62 and dielectric layer 64 may be wound to form a Swiss-roll structure and may be optionally cured for curing the polymeric material. An optional, further heat-treatment may follow the curing depending on the polymer material and desired properties of the dielectric material. Further heat-treatment is normally conducted in a non-oxidizing atmosphere to avoid oxidation of the metallic layer, thereby preventing a property change of the metals of the metallic layer. A vacuum, inert atmosphere, or reducing atmosphere are non-limiting examples of a non-oxidizing atmosphere in which to heat treat the structure. The resulting Swiss-roll structure 56 has an integrated monolithic structure, wherein the metallic and dielectric layer in the form of Swiss-roll are physically not separable, during the handling and application of the Swiss-roll structure, and in certain embodiments has a density greater than about 98% by volume of theoretical density.

EXAMPLES

The following examples illustrate methods, materials and results, in accordance with specific embodiments, and as such should not be construed as imposing limitations upon the claims. All components are commercially available from common chemical suppliers.

Preparation of Materials:

A general method of preparation followed for ceramic polymeric blends identified in different examples are outlined below. However, one skilled in the art would appreciate that small variations in the starting materials; temperatures, times, and atmospheres of preparation, calcination, and sintering; size and shape variations of the prepared powders and bulk materials could be accommodated to the examples presented below.

Swiss-Roll Preparation with Epoxy as a Polymer

Initially epoxy resin was added to a suitable hardener in the ratio 5:1 by weight and the resultant mixture was blended with ceramic (eg. $TiO_2$ nanoparticle) in various concentrations by weight using a mortar and pestle. A soft copper strip (made soft by annealing in an inert atmosphere at 700-800° C.) was stretched and made to stick on a surface of glass. The blend of epoxy, hardener and ceramic particles was coated on to the copper strip using the doctor's blade technique.

The composite coated copper strip was rolled around a wooden/PTFE rod of required diameter, forming a green body. The roll was then pushed out from the rod. The formed roll was cured at room temperature (RT) for 72 hours or at 100° C. for 48 hours, to obtain the final structure.

Swiss-Roll Preparation with PTFE as a Polymer

PTFE powder was thoroughly mixed with the ceramic powder using ball milling in ethanol solution. The copper strip was either sand blasted or rubbed with a high grit (grit size 60) emery paper to make its surface rough for better adherence of the ceramic-PTFE composite with copper, because unlike epoxy, PTFE does not easily stick to copper. A soft copper strip (made soft by annealing in an inert atmosphere at 700-800° C.) was stretched and made to stick on a surface of glass.

The composite was converted into a paste by either mixing it with ethanol or distilled water along with 2 wt % of 5 wt % polyvinyl alcohol (PVA) to increase the strength of the paste. The liquid phase (water or ethanol) was added in a minimum quantity so as to obtain a high-viscosity thick paste. The paste was then coated on the copper strip using the doctor's blade technique. The composite-coated polymer strip was rolled around a wooden/PTFE rod of a required diameter and held with adhesive tape.

The roll was cured at 350° C. for 1 hour in argon. The curing was done under some pressure from outside and inside the Swiss-roll by constraining the Swiss-roll from both outside and inside. The application of pressure is desirable in the case of PTFE because, unlike epoxy, it does not stick to the copper surface well, and therefore, has a chance of disintegrating while heating. Therefore, pressure was applied as an aid to obtain a monolithic Swiss-roll structure after curing. In case of addition of PVA to form a paste, the roll was pre heated at 200° C. for 10 hours for its burnout before subjecting it to curing.

Some examples of the combination of the oxide compounds and polymeric materials along with their processing conditions and dielectric properties are tabulated below.

Table 1 provides the experimental processing details and results of the combination of titania with epoxy resin. In the table, the column "Material" denotes the different combinations of the ceramic and polymer materials, "conditions" are the processing conditions of ceramic and polymers together that are used for the current experiment. RT represents "room temperature". The dielectric constant (DC) and dielectric loss tangent (DLT) measured at particular frequency denoted at the column "At frequency" are presented. The column "frequency range" presents the approximate frequency range where the combination of ceramic and polymer materials are particularly advantageous to be used in a field-focusing element.

TABLE 1

| Material | Conditions | At Frequency | DC | DLT | Frequency range |
|---|---|---|---|---|---|
| 90 wt % $TiO_2$ + 10 wt % Epoxy | RT/72 hr | 10 MHz | 14.31 | 0.0274 | 1 MHz-10 MHz |
| 85 wt % $TiO_2$ + 15 wt % Epoxy | RT/72 hr | 58 MHz | 12.48 | $8.70e^{-05}$ | 1 MHz-60 MHz |
| 80 wt % $TiO_2$ + 20 wt % Epoxy | RT/72 hr | 54 MHz | 12.26 | $1.11e^{-04}$ | 700 KHz-64 MHz |
| 75 wt % $TiO_2$ + 25 wt % Epoxy | RT/72 hr | 7.7 MHz | 8.83 | $5.40e^{-05}$ | 1 MHz-10 MHz |
| 65 wt % $TiO_2$ + 35 wt % Epoxy | RT/72 hr | 1.28 MHz | 10.39 | $3.10e^{-05}$ | 700 KHz-24 MHz |
| 60 wt % $TiO_2$ + 40 wt % Epoxy | RT/72 hr | 136 KHz | 9.43 | $7.90e^{-05}$ | 10 KHz-1 MHz |
| 55 wt % $TiO_2$ + 45 wt % Epoxy | RT/72 hr | 3 MHz | 8.83 | $3.31e^{-04}$ | 1 MHz-29 MHz |
| 50 wt % $TiO_2$ + 50 wt % Epoxy | RT/72 hr | 228 KHz | 7.5 | $1.53e^{-04}$ | 150 KHz-10 MHz |

Table 2 provides the experimental processing details and results of the combination of $SrTiO_3$ with PTFE and epoxy resin. Table 2.

| Material | Conditions | At Frequency | DC | DLT | Frequency range |
|---|---|---|---|---|---|
| 65 wt % $SrTiO_3$ + 35 wt % PTFE | 350° C./1 hr | 6.09 MHz | 10.08 | $4.00e^{-05}$ | 100 KHz-20 MHz |
| 60 wt % $SrTiO_3$ + 40 wt % PTFE | 350° C./1 hr | 469 KHz | 13.55 | $2.19e^{-04}$ | 300 KHz-650 KHz |
| 55 wt % $SrTiO_3$ + 45 wt % PTFE | 350° C./1 hr | 1.93 MHz | 11.48 | $3.26e^{-04}$ | 500 KHz-5 MHz |
| 50 wt % $SrTiO_3$ + 50 wt % PTFE | 350° C./1 hr | 497 KHz | 5.18 | $2.83e^{-04}$ | 200 KHz-1 MHz |
| 65 wt % $SrTiO_3$ + 35 wt % Epoxy | RT/72 hr | 1.87 MHz | 14.35 | $1.11e^{-3}$ | 1 MHz-10 MHz |

Table 3 provides the experimental processing details and results of the combination of $MgTiO_3$ with PTFE and epoxy resin. Table 3.

| Material | Conditions | At Frequency | DC | DLT | Frequency range |
|---|---|---|---|---|---|
| 65 wt % $MgTiO_3$ + 35 wt % PTFE | 350° C./1 hr | 1.07 MHz | 6.93 | $1.18e^{-04}$ | 600 KHz-1.5 MHz |
| 60 wt % $MgTiO_3$ + 40 wt % PTFE | 350° C./1 hr | 1.4 MHz | 6.16 | $1.61e^{-04}$ | 1 MHz-2 MHz |
| 55 wt % $MgTiO_3$ + 45 wt % PTFE | 350° C./1 hr | 1.44 MHz | 4.73 | $1.01e^{-04}$ | 1 MHz-2 MHz |
| 50 wt % $MgTiO_3$ + 50 wt % PTFE | 350° C./1 hr | 281 KHz | 5.53 | $1.73e^{-04}$ | 85 KHz-400 KHz |
| 65 wt % $MgTiO_3$ + 35 wt % Epoxy | RT/72 hr | 455 KHz | 7.61 | $1.38e^{-4}$ | 300 KHz-10 MHz |

Table 4 provides the experimental processing details and results of the combination of fluorine doped $Ba_{0.4}Sr_{0.6}TiO_3$ with PTFE and epoxy resin.

TABLE 4

| Material | Conditions | At Frequency | DC | DLT | Frequency range |
|---|---|---|---|---|---|
| 90 wt % $Ba_{0.4}Sr_{0.6}TiO_3$—F + 10 wt % PTFE | 350° C./1 hr | 3.58 MHz | 9.02 | $3.05e^{-04}$ | 1.3 MHz-10 MHz |
| 85 wt % $Ba_{0.4}Sr_{0.6}TiO_3$—F + 15 wt % PTFE | 350° C./1 hr | 2.76 MHz | 11.17 | $2.15e^{-04}$ | 1.7 MHz-4.5 MHz |
| 80 wt % $Ba_{0.4}Sr_{0.6}TiO_3$—F + 20 wt % PTFE | 350° C./1 hr | 1.66 MHz | 8.35 | $9.10e^{-05}$ | 1 MHz-3 MHz |

TABLE 4-continued

| Material | Conditions | At Frequency | DC | DLT | Frequency range |
|---|---|---|---|---|---|
| 75 wt % $Ba_{0.4}Sr_{0.6}TiO_3$—F + 25 wt % PTFE | 350° C./1 hr | 1.66 MHz | 7.68 | $5.40e^{-05}$ | 1 MHz-2.7 MHz |
| 70 wt % $Ba_{0.4}Sr_{0.6}TiO_3$—F + 30 wt % PTFE | 350° C./1 hr | 455 KHz | 5.74 | $1.97e^{-04}$ | 255 KHz-700 KHz |
| 65 wt % $Ba_{0.4}Sr_{0.6}TiO_3$—F + 35 wt % PTFE | 350° C./1 hr | 238 KHz | 6.46 | $7.50e^{-05}$ | 35 KHz-500 KHz |
| 60 wt % $Ba_{0.4}Sr_{0.6}TiO_3$—F + 40 wt % PTFE | 350° C./1 hr | 188 KHz | 5.43 | $3.70e^{-05}$ | 22 KHz-500 KHz |
| 55 wt % $Ba_{0.4}Sr_{0.6}TiO_3$—F + 45 wt % PTFE | 350° C./1 hr | 200 KHz | 5.25 | $1.39e^{-04}$ | 20 KHz-500 KHz |
| 50 wt % $Ba_{0.4}Sr_{0.6}TiO_3$—F + 50 wt % PTFE | 350° C./1 hr | 469 KHz | 4.3 | $2.00e^{-04}$ | 320 KHz-600 KHz |
| 65 wt % $Ba_{0.4}Sr_{0.6}TiO_3$—F + 35 wt % Epoxy | RT/72 hr | 4.53 MHz | 3.8 | $2.30E^{-03}$ | 1 MHz-10 MHz |

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power transfer system comprising:
a first coil coupled to a power source;
a second coil coupled to a load; and
a field-focusing element disposed between the first coil and the second coil and comprising a dielectric material and two open ends, wherein the field-focusing element is configured to develop a standing wave current distribution and focus a magnetic field onto the second coil, wherein the field-focusing element comprises multiple sets of resonators, each set of resonators configured to be excited to a different phase to facilitate focusing the magnetic field in a desired direction, and wherein the dielectric material comprises:
an oxide compound comprising titanium; and
a polymer material comprising a resin.

2. The power transfer system of claim 1, wherein the field-focusing element comprises a plurality of resonators arranged in an array, and wherein the sets of resonators are configured to enhance the magnetic field in the direction of the second coil.

3. The power transfer system of claim 1, wherein the field-focusing element comprises a single loop.

4. The power transfer system of claim 1, wherein the field-focusing element comprises a spiral structure.

5. The power transfer system of claim 2, wherein a resonator of the plurality of resonators is embedded in the dielectric material.

* * * * *